Figure 1:
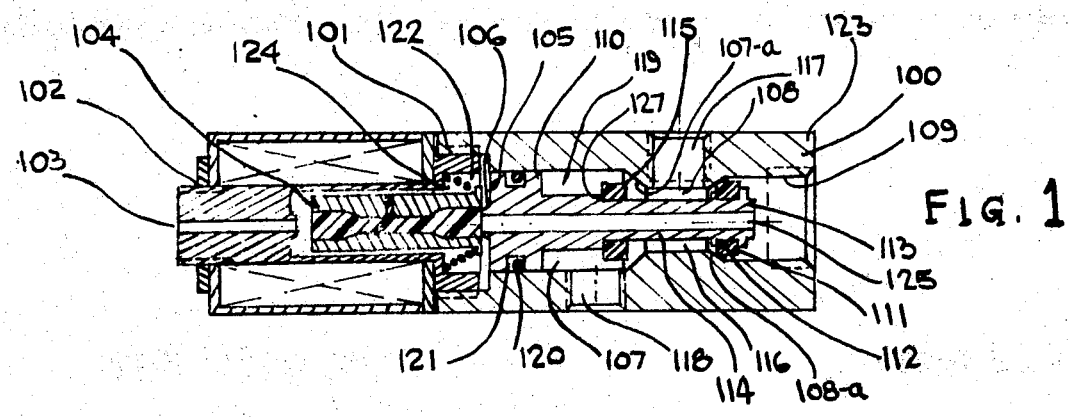

United States Patent [19]

Pauliukonis

[11] 3,768,517
[45] Oct. 30, 1973

[54] SOLENOID OPERATED SIMPLE CONTROL VALVES

[76] Inventor: Richard S. Pauliukonis, 6660 Greenbriar Dr., Cleveland, Ohio 44130

[22] Filed: Sept. 20, 1971

[21] Appl. No.: 181,874

[52] U.S. Cl. .......................................... 137/625.65
[51] Int. Cl. ............................................. F16k 11/02
[58] Field of Search ......... 137/444 X, 625.6–625.64

[56] References Cited
UNITED STATES PATENTS

| | | | |
|---|---|---|---|
| 1,302,538 | 5/1919 | Gulick | 137/444 X |
| 2,716,425 | 8/1955 | Yarber | 137/625.64 |
| 2,641,279 | 6/1953 | Baldwin | 137/625.6 |
| 2,964,057 | 12/1960 | Dyson | 137/625.6 |
| 2,965,132 | 12/1960 | Couffer et al. | 137/625.64 |
| 3,126,915 | 3/1964 | Hunt | 137/625.64 X |
| 3,167,632 | 1/1965 | O'Connor | 137/625.61 X |
| 3,315,702 | 4/1967 | Passaggio | 137/625.64 |

Primary Examiner—Henry T. Klinksiek

[57] ABSTRACT

Solenoid operated simple springless directional valves, each comprised of a valve body, a piston-rod assembly, and a 3-way solenoid operator, for use with pressurized pneumatic, and/or hydraulic fluids, each valve comprising a valve body with appropriate bore for receiving slidably a piston-rod assembly made to shift axially within the limitations provided by rod seals, acting as stops, of disk configuration- sliced from appropriate elastomer tubing- and a piston seal of O-ring configuration dividing the valving end of the valve housing from the operating valve housing end, each piston rod with appropriate apertures terminating inside the valve operating end section with a seat for the solenoid plunger to seal off fluid communication between valving and operating ends, each solenoid operator permanently secured therein thereby controlling valve operation in that the piston-rod assembly shifts from its original position to another position as a result of larger end force from fluid pressure acting over the larger diameter piston end when said solenoid plunger unseals said fluid communication apertures shutting off solenoid exhaust, and by returning the piston rod assembly to the original position when the solenoid is deenergized and the plunger shuts off the apertures in the piston end while exhausting via now open solenoid exhaust port.

8 Claims, 3 Drawing Figures

PATENTED OCT 30 1973 3,768,517

INVENTOR.
RICHARD S. PAULIUKONIS
BY

SOLENOID OPERATED SIMPLE CONTROL VALVES

In the Patent application, Ser. No. 145751 for SIMPLE CONTROL VALVES we had outlined the fundamentals of a novel two piece valve design wherein a simple pin inside a valve body is retained by a seal which performs a dual function, namely to secure subject pin inside said valve body and to seal flow passages by the action of the fluid pressure automatically without the use of any kind of springs during the axial shift within the limits the seals provide when pin is actuated by external means for seal cracking and subsequent establishment of fluid communication between the fluid supply and the receiver, said actuating means representing an external force being caused manually, by toggle, hand or foot lever, by a timer cam, by pilot pressure or a solenoid valve for valve operation electrically through automatic controls.

The present invention will consider the same basic valve design fundamentals as described in the copending application Ser. No. 145,751 identifying a two piece valve construction details and will apply a solenoid operator as an adjunct to the invention in question by further simplification of the basic principles of the state of art in solenoid operated valves.

These and other objects and advantages of the invention will become more fully apparent from the following description of the embodiment of the invention, taken together with the accompanying drawings:

IN THE DRAWINGS

FIG. 1 illustrates a cross-sectional view of the solenoid operated 3-way directional valve with cylinder port normally closed, embodying the invention.

Figure 2:
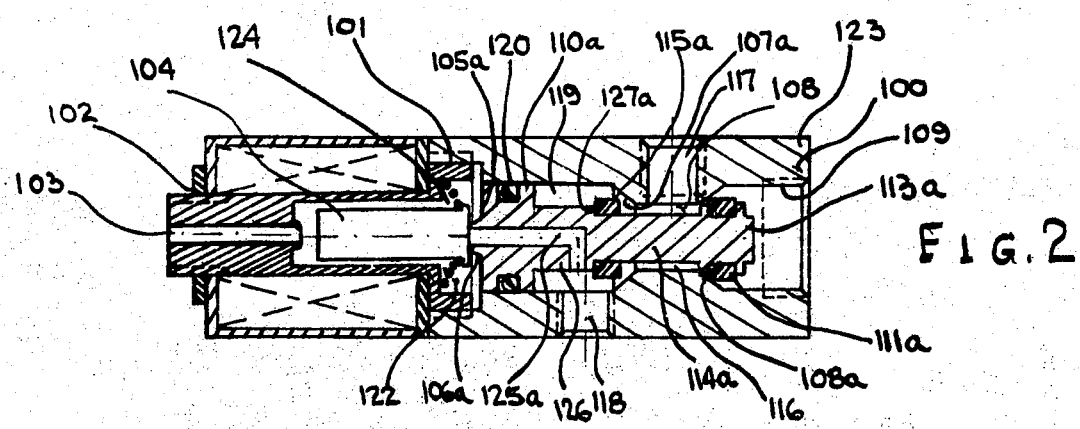

FIG. 2 showing a cross-sectional view of a 3-way solenoid operated directional valve identifies a design variation in which the cylinder port is normally open due to a simple modification of the aperture pathway in the piston-rod assembly and a change of fluid supply port from that identified in FIG. 1.

Figure 3:
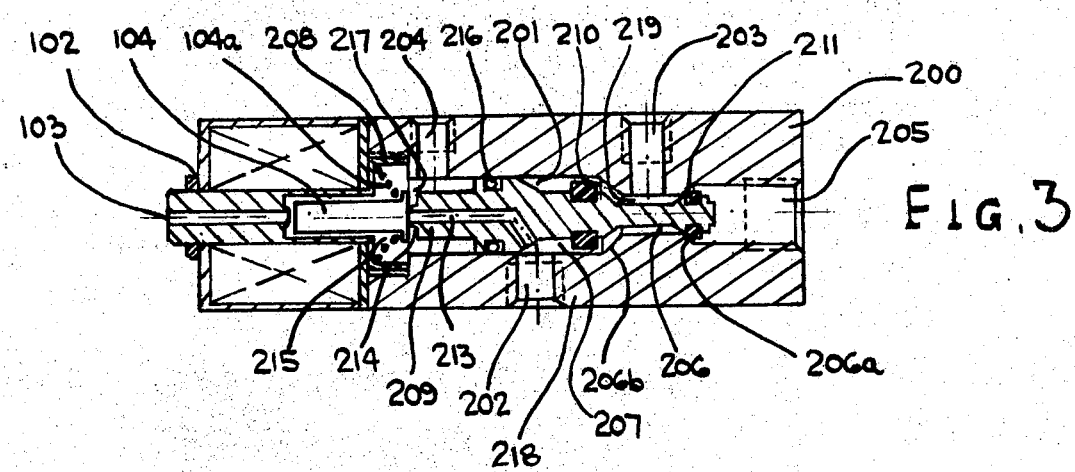

FIG. 3 illustrates a cross-sectional view of another modified valve subject to present invention in that the addition of an extra port to the valve body resulted in a 4-way valve without a significant design complication.

Shown in FIG. 1 is a valve housing 100 having a continuous central bore of different diameters along the housing length in which bore 101 of large diameter at one end of the housing is threaded to receive a solenoid operator assembly 102, having a solenoid exhaust port 103 and a plunger 104 which in the illustrated case identifies solenoid exhaust opened to the atmosphere while the plunger is firmly pressed against the end of the piston head 105 provided with small seat 106 bore 101 becomes smaller diameter central bore section 107 which reduces in size considerably via countersink 107a leading to a smallest body bore 108 that eventually increases in size through another countersunk opening 108a to result in a slightly larger threaded opening 109 at the other extreme housing end. Coutersinks 107 a and 108 a serve as valve sealing means when piston-rod assembly 110 is slidably inserted into the housing 100 via large diameter bore 101, and secured permanently therein by an elastomer seal disk 111 through the opening 109, inside appropriate groove 112 at the rod end 113, opposite to the larger diameter piston end 105. A seal 115 when placed against shoulder 127, of rod diameter 114, of a diameter which is larger than the valve body bore 108, together with the seal disk 111 which is also larger than the bore 108 secures the piston-rod assembly 110 permanently & safely inside the body bore to float in limited motion axially, which is just enough to allow fluid communication into the annular space 116 & the perpendicular body opening 117 as well as opening 118 through another annular passage 119. Seal 120 permanently secured inside appropriate groove 121 of piston 105 insures positive separation between the annular passage space 119 and a cavity 122 and, in fact, divides the valve body housing into the valving section 123 and operating section 124 which houses solenoid operator assembly 102. A longitudinal, centrally located opening 125 along the piston-rod assembly 110 terminating with a small seat 106 is the only means for fluid communication between the valving section 123 and the operating section 124. In the illustrated case, the elastomer seal 111 is firmly pressed against the seat 108a, at fluid inlet threaded opening 109 of one end of the piston-rod assembly simply because of full system pressure action over the exposed piston end 113 even though its center is hollow due to the opening 125 which is sealed at the other piston-rod assembly end at 106 by the plunger 104. Only when the solenoid is energized electrically, the plunger 104 unseats this opening 106 and permits fluid flow into the backside of the piston head to fill the cavity 122 with pressurized fluid and to shift the piston-rod assembly for cracking the seal 111 and for subsequent fluid communication between the inlet port 109 and the annular space 116 feeding the opening 117 while the seal 115 is firmly pressed against the shoulder of countersink 107a shutting off any communications with annulus 119. Should opening 117 be provided with a power cylinder, it would receive full power of the working fluid for cylinder actuation and work, until the solenoid becomes deenergized at which time the plunger 104 returns to the original position to seal off the center opening 125 of the piston-rod assembly 102 by pressing against the seat 106 and allowing the cavity 122 to become atmospheric while exhausting solenoid working fluid via exhaust port 103. In turn the piston-rod assembly 110 shifts to the original position with seal 111 closing further fluid supply to the cylinder in port 117 and allowing cylinder exhaust via annular space 119 and its perpendicular exhaust port 118 because of cracking seat sealed by an elastomer disk 115 against the shoulder of countersink 107a. Due to large clearances between the piston rod diameters that follow differential diameter bore with ample annular space for fluid flow not found in other designs, and because of practically no frictional losses associated with this type of valve design as compared with designs that employ spools, there is no need to limit port sizes for connecting to the supply or receiver means for fluid entrance and exhaust, and no requirements for large axial motion for valve operation with results of improved speed, capacity & size of this valve. FIG. 2 shows a valve including valve housing 100 identical to the valve shown in FIG. 1 except for a differently drilled piston-rod assembly 110a which not only replaces piston 110 shown in FIG. 1 but in FIG. 2 when inserted slidably into an elongated valve body bore 101 and secured permanently therein by an elastomer seal disk 115a at the shoulder 127a of rod diameter 114a and the elastomer seal disk 111a of the rod end 113a both of which are larger than the housing bore diameter 108 through the opening 109 to float axially within seats 107a and 108a inside valving portion 123 of the valve body 100, but also converts this valve from a Normally Closed valve assembly shown in FIG. 1 to a Normally Open valve assembly of FIG. 2 wherein the port 118 serves as fluid supply means to feed cylinder attached to the port 117 via annular spaces 119 and 116 which are open while the port 109 is closed by the seal disk 111a for as long as the solenoid operator 102 is deenergized, and the apertures 125a inside piston-rod assembly 110a initiating midway of the piston-rod assembly in large diameter 126 and ending at the piston head 105a is sealed at the seat 106a by the solenoid plunger 104. The operating section 124 in the illustrated case,- FIG. 2 is open to exhaust. Only when the solenoid is energized electrically, does the plunger 104 unseat the opening 125a at seat 106a permitting the fluid flow into the backside of the piston head 105a to fill the cavity 122 with the pressurized fluid and shifting the piston-rod assembly for cracking seal 111a to permit cylinder exhaust through port 117 via annulus 116 now open to communicate with port 109 which may serve as the cylinder exhaust. Again, this design offers unparalleled improvements in the design of a simple valve which incorporates operating characteristics of a poppet valve without being a poppet valve in the absolute sense as it uses detachable and replaceable seals of elastomer disk or O-ring configuration and provides large flow characteristics with minimum pressure drop within rather small dimensional size of the valve envelop, and with little motion axially, characteristic to a fast response valve, all of which are considered premium characteristics at cost which can not be but lower than the cost of the expensive poppet valves now in existence. During the time that the solenoid is energized, the solenoid exhaust 103 is closed permitting pressure build-up in the cavity 122 of the operating valve section, and subsequent shift of the piston-rod assembly 110a for cylinder exhaust described, and, when solenoid is deenergized, the solenoid exhaust port 103 permits the exhaust of the cavity 122 to enable piston-rod return to the original Normally Open condition by virtue of fluid pressure over the piston area exposed to the fluid pressure inside annular space 119, and without the use of any springs normally employed with the majority of other designs of similar valves. This axial position change of the piston-rod assembly without springs is possible only because of differential areas exposed to the fluid pressure with piston head 105a as the largest area exposed to such fluid pressure for an immediate shift when solenoid is energized, closing the solenoid exhaust port 103 and building up pressure inside the cavity 122.

FIG. 3 identifies a design of a four-way valve which employs the same fundamental principle of shifting piston-rod assembly within the valve body by virtue of differential areas exposed to the pressure of the working fluid with the directional position change of the piston-rod within the valve body dominated by the end thrust developed over the areas built-in into the valve design upon actuation of solenoid which controls fluid communication within valve proper and subsequent directional valve operation, effortlessly. Because one of the cylinder ports will be fed via apertures provided inside the piston-rod assembly which may be limited to a certain specific size physically, the four-way valve under consideration will exhibit various operating characteristics, dependant on the ultimate size chosen for valve design that utilizes the principles of this invention. Whereas the ports of 3-way valves described previously enable designs that provide full flow orifices equivalent to porting, rarely attainable with valves other than poppet valves if at all, the design of a four-way valve to be described may have full size orifices in all ports of smaller valve sizes and only a partial size orifice for the cylinder port which will be controlled by the solenoid action in sealing and exhausting capabilities primarily. In general this design characteristic can be considered insignificant in the overall design parameter subject to this invention. Therefore, refering to the illustration depicted in the FIG. 3, we identify an elongated housing 200 with a centrally located bore 201 of differential diameter and the ports perpendicular to the central bore, with port 202 serving as fluid supply port in communication with bore 201, port 203 serving cylinder ONE which has no piston rod , and port 204 serving cylinder TWO with piston rod inside, this on purpose to compensate for loss of flow in case of large flow requirements designated for this 4-way solenoid operated valve.

Port 205 at one end of the housing will serve as cylinder One exhaust, and will be provided with a countersunk bore 206 of reduced size with shoulder 206a serving as sealing means while the other end of bore 206 terminates with a shoulder 206b leading to an enlarged central body bore 207 which terminates at the opposite housing end with a threaded large opening 208 to receive a solenoid assembly 102, which is placed therein after the piston-rod assembly 209 is slidably inserted into the bore 201 and permanently secured therein by elastomer seals 210 and 211 which control axial motion of this piston rod assembly and subsequent valve operation to alternately feed either cylinder One which in the illustrated case is Normally Open to fluid supply, or cylinder TWO which in the illustrated case is closed, such valve operation controlled by the solenoid operator 102 whose plunger 104 in the illustrated case seals apertures 213 inside piston-rod at seat 214, for as long as it is not energized electrically, and upon solenoid energization, this plunger moves back to close solenoid exhaust port 103 while permitting fluid communication between the fluid supply port 202 and the housing end cavity 215 adjacent to and in communication with port 204 leading to cylinder TWO for subsequent energization and work, at the same time exerting a pressure over the piston-rod end 214 which shifts forward when provided with seal 216 separating operating housing end 217 from the valving housing end 218 until seal 210 is firmly pressed against the shoulder 206b closing fluid communication with normally open port 203 feeding cylinder ONE and at the same time cracking seal 211 for cylinder ONE exhaust via annulus 219 leading to the exhaust port 205.

Upon the deenergization of the solenoid, the plunger 104 of the solenoid operator 102 is forced back into its original position by a solenoid spring 104a closing the fluid supply port 213 at the seat 214 which creates a force unbalance at the piston-rod assembly surfaces forcing the whole piston-rod assembly to return to the original position with cylinder ONE becoming Normally Open while the Cylinder TWO is to exhaust via solenoid exhaust 103 in direct communication with the cavity 215 and cylinder TWO port 204.

The operation of this valve may continue for as long as the solenoid is energized with subsequent shift of the piston-rod assembly to either feed or exhaust alternatively the cylinder ONE or the Cylinder TWO within a valve design that entails the bare simplicity of being constructed from only two parts plus solenoid operator.

The invention is not restricted to the slavish imitation of each and every one of the details described above which have been set forth merely by way of example with the intent of most clearly setting forth the teachings of the invention. Obviously, devices may be provided which change, eliminate, or add certain specific structural or procedural details without departing from the invention

What is claimed is:

1. A valve for transmitting pressurized fluid from supply to receiver means comprising:

an elongated valve housing having cylindrical differential diameter axially extending bore therethrough with enlarged ends extending inwardly and interconnected by a portion of reduced diameter housing bore substantially midway thereof including shoulders formed between said enlarged and reduced diameters, one first enlarged bore end of which receiving slidably an elongated piston rod assembly with piston of close sliding fit is adaptable to be closed by a solenoid operator and the opposite second bore end open and adaptable for use as fluid supply and exhaust port means, said shoulders including first shoulder facing said first bore end and second shoulder facing said second bore end, said housing further including at least a pair of perpendicular ports, one of said ports communicating with said first enlarged bore end adjacent said shoulder and adaptable for use as a first fluid port and the other of said ports communicating with said reduced diameter portion between said shoulders and adaptable to be connected to a receiver such as a power cylinder for use as a second fluid port, said second enlarged bore end open serving as a third fluid port, one of said first and third ports being adapted to be connected to a continuous fluid supply, said piston rod assembly having piston inside elongated bore between said first enlarged bore end and said first port with said piston end face at one end and a rod of reduced diameter terminating with a final poppet having diameter less than said piston but greater than said reduced diameter housing bore portion at the opposite end of said piston rod assembly for selectively blocking fluid flow between said second and third ports, said poppet firmly seated against said second shoulder a seal in said piston dividing said valve housing into essentially valving and operating sections with valving section containing said piston rod assembly and the operating section containing said solenoid operator, said piston rod assembly further including a center poppet spaced along said rod from final poppet substantially midway between said piston and said final poppet, said center poppet having diameter larger than said reduced diameter housing bore portion but less than said first enlarged bore end provided with said piston for selectively blocking fluid flow between said first and second ports when firmly seated against said first shoulder, said assembly being selectively shiftable between the first position wherein fluid communication is permitted between said first and second ports via annulus formed between said piston rod and said first enlarged bore end and reduced diameter housing bore portion when final poppet is firmly seated against said second shoulder and a second position wherein fluid communication is permitted between said second and third ports via annulus formed between said piston rod and said reduced diameter housing bore portion when said center poppet is firmly seated against said first shoulder, said assembly further including a fluid passage extending therethrough from said piston end face inside operating section for selectively allowing fluid communication between one of said first and third ports inside said valving section through said passage and outwardly of said end face, said solenoid operator in said valve operating section comprising an electrically actuated valve operator disposed at said first enlarged bore and of said housing, said operator being selectively movable between an open position spaced from said piston end face defining a fluid cavity therebetween and a closed position in blocking engagement with said passage at said end face wherein when said operator is moved into said open position said piston assembly is shifted to said second position by fluid acting on said piston end face with force larger than the force exerted over surfaces inside valving section permitting fluid communication between said second and third ports while said center poppet is firmly seated against said first shoulder, and when said operator is moved into said closed position, said piston assembly returns to said first position by the force exerted over the surfaces inside valving section permitting fluid communication between said first and second ports, said valve operator further including means for exhausting fluid from said cavity as said operator is moved from said open toward said closed position and thereby eliminating force said piston end face inside said operating section experienced to permit piston rod assembly return to said first position automatically and without the use of springs inside said valving section.

2. A valve as defined in claim 1 wherein said solenoid operator inside said operating section including a plunger disposed generally coaxial with said piston rod assembly and axially movable between said open and said closed positions, energization of said solenoid causing said plunger to be moved from said closed position, de-energization of said solenoid causing said plunger to return to said closed position which is maintained by a plunger spring forcing said plunger against said piston end face to maintain said fluid passage closed while said fluid cavity is open to exhaust for as long as the solenoid is de-energized, said plunger closing said cavity exhaust when solenoid is energized permitting said operating cavity to be pressurized by the fluid entering via said fluid passage in said piston assembly from the valving section for shifting said piston assembly inside said valving section axially to float in limited motion just enough for resultant improvement in operational speed, flow capacity and size of this valve.

3. A valve as defined in claim 2, wherein said fluid passage extends generally longitudinally through said piston rod assembly and said third fluid port is adapted to be connected to said continuous fluid supply source wherein when said plunger is in said open position, fluid passes through said passage from said third port into said cavity inside said operating section to force said piston rod assembly inside said valving section to said second position permitting fluid communication between said third and said second fluid ports, and when said plunger is moved from said open to said closed position, said piston rod assembly returns to said first position inside said valving section closing fluid supply from said third fluid port to said second fluid port by the pressure of the fluid over final poppet exerting enough force to firmly seat said final poppet against said second shoulder and opening fluid communication between said second and first fluid ports via said annuluses therein.

4. A valve as defined in claim 3 wherein said second fluid port is adapted to be connected to a fluid power cylinder and said first fluid port is adapted to be connected to a fluid exhaust, comprising a valve with fluid supply port normally closed.

5. A valve as defined in claim 2 wherein said fluid passagw extends between said piston end face inside operating section and a piston rod portion disposed inside said annulus formed between said piston rod and said first enlarged bore end substantially midway between piston and said center poppet to fluidly interconnect said first fluid port inside said valving section, and said first fluid port is adapted to be connected to said continuous fluid supply source wherein when said plunger is in said open position fluid passes from said valving section via said passage into said operating section pressurizing said cavity to force said piston rod assembly to said second position firmly seating said center poppet against said first shoulder and precluding fluid supply from said first to said second fluid ports while said second fluid port is allowed to exhaust via said annulus formed between said piston rod and said reduced diameter housing bore portion and said open second bore end comprising third fluid port, and when said plunger is moved from said open to said closed position inside said operating section, said piston rod assembly is moved from said second to said first positions by fluid pressure acting on said piston side exposed to it inside said valving section with force large enough to firmly seat said final poppet against second shoulder closing third fluid port and opening fluid communication between said first and second fluid ports.

6. A valve as defined in claim 5 wherein said second fluid port is adapted to be connected to a fluid power cylinder and said third fluid port is adapted to be connected to a fluid exhaust, comprising a valve with fluid supply port normally open.

7. A valve as defined in claim 5 further including a fourth fluid port in said housing entering first enlarged bore end inside operating section extending said housing in communication with said cavity wherein when said plunger is in said open position, fluid passes through said passage into said cavity to force said piston rod assembly to said second position and permit fluid communication between said first and fourth ports and between said second and third fluid ports, and when said plunger is moved from said open to said closed position, said piston rod assembly shifts from said second to said first position by fluid pressure acting on said piston side exposed to it inside said valving section with force large enough to firmly seat said final poppet against second shoulder closing third fluid port and opening fluid communication between said first and second fluid ports, and said fourth fluid port and said solenoid exhaust port.

8. A valve as defined in claim 7 wherein said second and fourth fluid ports are each adapted to be connected to a fluid power cylinder and said third and exhaust ports are adapted to be connected to fluid exhaust, comprising a four-way directional two position valve.

* * * * *